United States Patent
Kang et al.

(10) Patent No.: US 10,147,917 B2
(45) Date of Patent: Dec. 4, 2018

(54) SECONDARY BATTERY INCLUDING POLYMER MATERIAL LAYER AND METHOD OF MANUFACTURING THE SAME, HAVING A CASE SEAMLESSLY FORMED AS A SINGLE BODY

(71) Applicant: Samsung SDI Co., Ltd., Yongin-si, Gyeonggi-do (KR)

(72) Inventors: Jee-Won Kang, Yongin-si (KR); Byong-Gon Lee, Yongin-si (KR); Ki-Soo Lee, Yongin-si (KR); Jake Kim, Yongin-si (KR); Maeng-Eun Lee, Yongin-si (KR); Jee-Hoon Han, Yongin-si (KR); Seon-Hong Lee, Yongin-si (KR); Jong-Man Kim, Yongin-si (KR); Young-Woong Kwon, Yongin-si (KR); Hee-Sung Choi, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 516 days.

(21) Appl. No.: 14/659,281

(22) Filed: Mar. 16, 2015

(65) Prior Publication Data
US 2015/0340666 A1  Nov. 26, 2015

(30) Foreign Application Priority Data

May 20, 2014 (KR) .......................... 10-2014-0060490

(51) Int. Cl.
*H01M 2/02* (2006.01)
*H01M 2/08* (2006.01)
(Continued)

(52) U.S. Cl.
CPC ........... *H01M 2/08* (2013.01); *H01M 2/0202* (2013.01); *H01M 2/026* (2013.01); *H01M 2/028* (2013.01);
(Continued)

(58) Field of Classification Search
CPC ........ H01M 2/08; H01M 2/30; H01M 2/0202; H01M 2/028; H01M 2/06; H01M 2/361;
(Continued)

(56) References Cited

U.S. PATENT DOCUMENTS

2005/0069763 A1  3/2005  Hong et al.
2005/0079412 A1  4/2005  Kim
(Continued)

FOREIGN PATENT DOCUMENTS

JP  2007-073402 A  3/2007
JP  2007-242602 A  9/2007
(Continued)

*Primary Examiner* — Gary D Harris
(74) *Attorney, Agent, or Firm* — Knobbe Martens Olson & Bear LLP

(57) ABSTRACT

A secondary battery and a method of manufacturing the same are disclosed. In one aspect, the method includes preparing an electrode assembly comprising a positive electrode plate, a negative electrode plate, and a separator interposed therebetween. The method also includes freezing the electrode assembly after the electrode assembly is filled with an electrolyte solution, dipping the frozen electrode assembly in a liquid polymer material, retrieving the dipped electrode assembly from the liquid polymer material, and curing an external surface of the electrode assembly.

18 Claims, 5 Drawing Sheets

(51) Int. Cl.
   H01M 2/30      (2006.01)
   H01M 2/06      (2006.01)
   H01M 2/36      (2006.01)
   H01M 10/04     (2006.01)
   H01M 10/052    (2010.01)
   H01M 10/058    (2010.01)
   H01M 10/0587   (2010.01)

(52) U.S. Cl.
   CPC .............. *H01M 2/06* (2013.01); *H01M 2/30* (2013.01); *H01M 2/361* (2013.01); *H01M 10/0404* (2013.01); *H01M 10/049* (2013.01); *H01M 10/0409* (2013.01); *H01M 10/052* (2013.01); *H01M 10/058* (2013.01); *H01M 10/0587* (2013.01)

(58) Field of Classification Search
   CPC ............. H01M 2/026; H01M 10/0409; H01M 10/049; H01M 10/052; H01M 10/058; H01M 10/0587; H01M 10/0404
   USPC .................................................. 429/179, 185
   See application file for complete search history.

(56) References Cited

U.S. PATENT DOCUMENTS

| | | | |
|---|---|---|---|
| 2006/0105237 A1 | 5/2006 | Oh | |
| 2006/0127756 A1* | 6/2006 | Seo | H01M 2/021 429/175 |
| 2007/0072071 A1 | 3/2007 | Lee | |
| 2015/0280177 A1* | 10/2015 | Keates | H01M 2/0217 29/623.2 |

FOREIGN PATENT DOCUMENTS

| | | |
|---|---|---|
| KR | 10-2001-0063338 A | 7/2001 |
| KR | 20-0344738 Y1 | 3/2004 |
| KR | 10-2004-0110597 A | 12/2004 |
| KR | 10-2006-0028172 A | 3/2006 |
| KR | 10-2007-0035876 A | 4/2007 |

\* cited by examiner

SECONDARY BATTERY INCLUDING POLYMER MATERIAL LAYER AND METHOD OF MANUFACTURING THE SAME, HAVING A CASE SEAMLESSLY FORMED AS A SINGLE BODY

INCORPORATION BY REFERENCE TO ANY PRIORITY APPLICATIONS

This application claims the benefit of Korean Patent Application No. 10-2014-0060490, filed on May 20, 2014, in the Korean Intellectual Property Office, the disclosure of which is incorporated herein in its entirety by reference.

BACKGROUND

Field

The described technology generally relates to a secondary battery and method of manufacturing the same.

Description of the Related Technology

Unlike primary batteries, secondary batteries are rechargeable and are therefore used in various high-tech electronic devices such as mobile phones, laptop computers, or camcorders. In particular, lithium secondary batteries have a higher driving voltage and a higher energy density per unit weight than other secondary batteries formed of other materials, such as nickel-cadmium (NiCd) batteries or nickel-metal hydride (NiMH) batteries.

SUMMARY OF CERTAIN INVENTIVE ASPECTS

One inventive aspect is a method of conveniently manufacturing a secondary battery with improved stability, and a secondary battery manufactured by the method.

Another aspect is a method of manufacturing a secondary battery that includes preparing an electrode assembly including a positive electrode plate, a negative electrode plate, and a separator between the positive and negative electrode plates; freezing the electrode assembly after an electrolyte solution is impregnated into the electrode assembly; dipping the frozen electrode assembly in a liquid polymer material; and curing the liquid polymer material at an external surface of the electrode assembly after retrieving the electrode assembly.

The freezing of the electrode assembly can include quick-freezing the electrode assembly.

The freezing of the electrode assembly can include dipping the electrode assembly in the electrolyte solution, retrieving the electrode assembly, and then freezing the electrode assembly.

The preparing of the electrode assembly can include preparing an electrode assembly including two electrode terminals that protrude from a side of the electrode assembly, and the dipping of the frozen electrode assembly can include dipping a portion of the electrode assembly excluding the two electrode terminals in the liquid polymer material.

The dipping of the frozen electrode assembly can include dipping the frozen electrode assembly in liquid epoxy.

Another aspect is a secondary battery that includes an electrode assembly including a positive electrode plate, a negative electrode plate, and a separator between the positive and negative electrode plates; an electrolyte solution disposed at least between the positive and negative electrode plates of the electrode assembly; and a polymer material layer covering an external surface of the electrode assembly. An inner surface of the polymer material layer directly contacts the electrode assembly.

The polymer material layer can have a uniform thickness.

The electrode assembly can include two electrode terminals that protrude from one side of the electrode assembly, and the polymer material layer can cover a portion of the external surface of the electrode assembly excluding the two electrode terminals.

A thickness of the polymer material layer at the other side of the electrode assembly can be greater than a thickness of the polymer material layer at remaining portions of the electrode assembly except the other side.

The polymer material layer can include epoxy.

Another aspect is a method of manufacturing a secondary battery, the method comprising preparing an electrode assembly comprising a positive electrode plate, a negative electrode plate, and a separator interposed therebetween, freezing the electrode assembly after the electrode assembly is filled with an electrolyte solution, dipping the frozen electrode assembly in a liquid polymer material, retrieving the dipped electrode assembly from the liquid polymer material, and curing an external surface of the electrode assembly.

In the above method, the freezing comprises quick-freezing the electrode assembly.

In the above method, the freezing comprises dipping the electrode assembly in the electrolyte solution, retrieving the electrode assembly from the electrolyte solution, and then freezing the electrode assembly.

In the above method, the preparing comprises providing an electrode assembly that includes two electrode terminals that protrude from a side of the electrode assembly, and wherein the dipping comprises dipping a portion of the electrode assembly except for the two electrode terminals in the liquid polymer material.

In the above method, the dipping comprises dipping the frozen electrode assembly in liquid epoxy.

Another aspect is a secondary battery comprising an electrode assembly comprising positive and negative electrode plates and a separator interposed therebetween, an electrolyte solution provided between the electrode plates, and a polymer material layer substantially covering an external surface of the electrode assembly, wherein an inner surface of the polymer material layer directly contacts the electrode assembly.

In the above secondary battery, the polymer material layer has a substantially uniform thickness.

In the above secondary battery, the electrode assembly further comprises two electrode terminals that protrude from a first side of the electrode assembly, wherein the polymer material layer substantially covers the external surface of the electrode assembly except for the two electrode terminals.

In the above secondary battery, the thickness of the polymer material layer on a second side of the electrode assembly opposite to the first side is greater than the thickness of the polymer material layer of the remaining portions of the electrode assembly.

In the above secondary battery, the polymer material layer comprises epoxy.

Another aspect is a secondary battery comprising an electrode assembly comprising i) positive and negative electrode plates; ii) a separator interposed between the electrode plates; and iii) electrode terminals electrically connected to the electrode plates and protruding from a first side of the electrode assembly. The secondary battery also comprises an electrolyte solution provided between the electrode plates and the separator and a polymer material layer substantially covering an external surface of the electrode assembly except for one ends of the electrode terminals, wherein an inner surface of the polymer material layer directly contacts the electrode assembly.

In the above secondary battery, the polymer material layer has a substantially uniform thickness.

In the above secondary battery, the thickness of the polymer material layer on a second side of the electrode assembly opposite to the first side is greater than the thickness of the polymer material layer of the remaining portions of the electrode assembly.

In the above secondary battery, the polymer material layer comprises epoxy.

In the above secondary battery, the electrode assembly is wound.

In the above secondary battery, the electrode assembly is substantially rectangular.

Another aspect is a method of manufacturing a secondary battery, the method comprising winding i) positive and negative electrode plates, ii) a separator interposed between the electrode plates, and iii) electrode terminals protruding from each of the electrode plates around a winding core. The method also comprises removing the winding core so as to form an electrode assembly, dipping the electrode assembly in an electrolyte solution so as to fill the electrode assembly with the electrolyte solution, freezing the electrode assembly filled with the electrolyte solution, dipping the frozen electrode assembly in liquid polymer material except for portions of the electrode terminals, and retrieving the dipped electrode assembly from the liquid polymer material.

In the above secondary battery, the freezing comprises quick-freezing the electrode assembly.

The above method further comprises curing an external surface of the electrode assembly.

In the above secondary battery, the liquid polymer material includes liquid epoxy.

DETAILED DESCRIPTION OF CERTAIN INVENTIVE EMBODIMENTS

Figure 1:
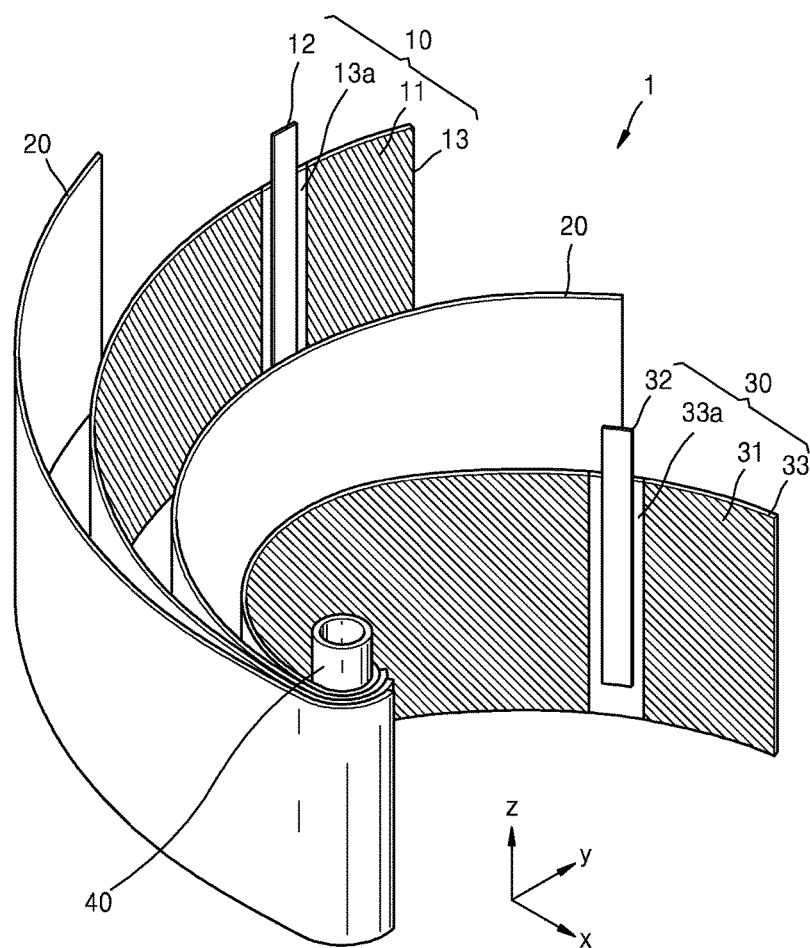
FIGS. 1 to 3 are perspective views and a cross-sectional view schematically illustrating processes of a method of manufacturing a secondary battery, according to an embodiment.

Generally, manufacturing secondary batteries can be complicated, which can lead to instability in the secondary batteries.

Reference will now be made in detail to embodiments, examples of which are illustrated in the accompanying drawings, wherein like reference numerals refer to like elements throughout. In this regard, the present embodiments can have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

It will be understood that when a layer, region, or component is referred to as being "formed on," another layer, region, or component, it can be directly or indirectly formed on the other layer, region, or component. That is, for example, intervening layers, regions, or components can be present. Also, sizes of elements in the drawings can be exaggerated for convenience of explanation. In other words, since sizes and thicknesses of components in the drawings are arbitrarily illustrated for convenience of explanation, the following embodiments are not limited thereto.

In the following examples, the x-axis, the y-axis and the z-axis are not limited to three axes of the rectangular coordinate system, and can be interpreted in a broader sense. For example, the x-axis, the y-axis, and the z-axis can be perpendicular to one another, or can represent different directions that are not perpendicular to one another. In this disclosure, the term "substantially" includes the meanings of completely, almost completely or to any significant degree under some applications and in accordance with those skilled in the art. Moreover, "formed on" can also mean "formed over." The term "connected" can include an electrical connection.

Figure 2:
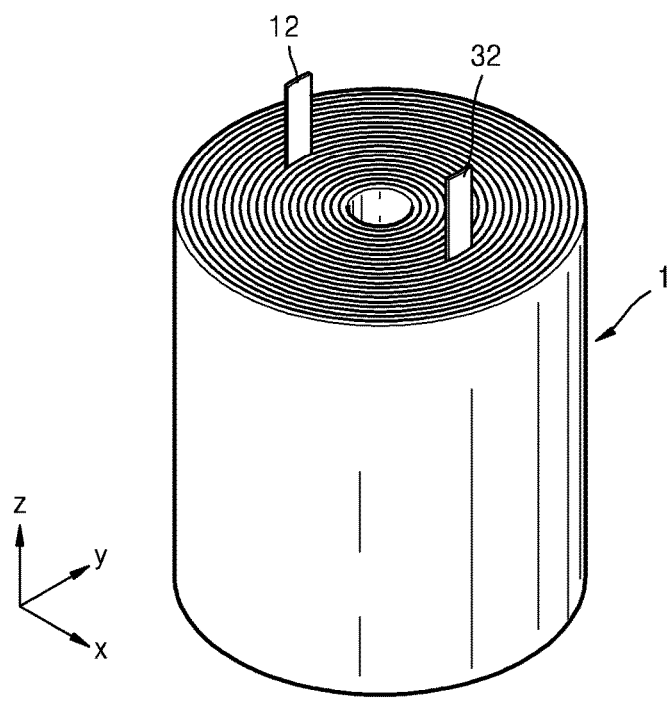
Figure 3:
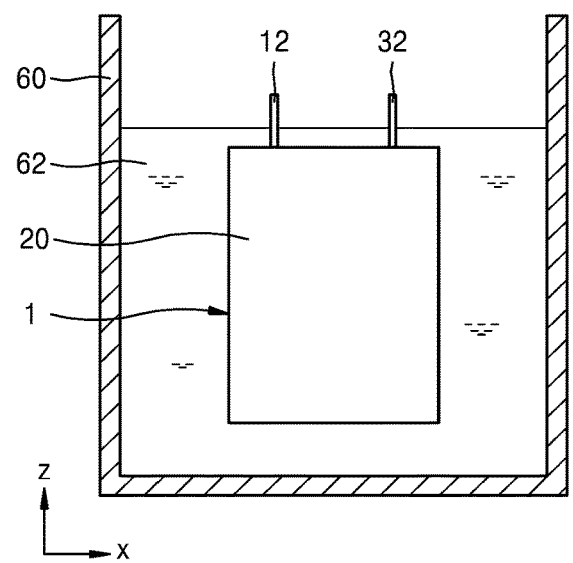

FIGS. 1 to 3 are perspective views and a cross-sectional view schematically illustrating processes of a method of manufacturing a secondary battery, according to an embodiment.

First, as illustrated in FIG. 1, a separator 20 is placed between a positive electrode plate 10 and a negative electrode plate 30. The positive electrode plate 10, the negative electrode plate 30, and the separator 20 are wound around a winding core 40. The separator 20 is not limited to being placed between the positive and negative electrode plates 10 and 30 as illustrated in FIG. 1. For example, the positive and negative electrode plates 10 and 30 and the separator 20 can be rolled while having another separator 20 placed at the outermost area.

The positive electrode plate 10 includes a positive lead 12 and a positive current collector 13 coated with a positive active material 11 on one side or both sides. The positive active material 11 can include lithium-based oxide. The positive lead 12 is attached to an uncoated region 13a of the positive current collector 13, in which the positive active material 11 is not coated, by welding or using other methods. As illustrated in FIG. 1, the positive lead 12 protrudes to an outer side of the positive current collector 13 in a z-axis direction.

The negative electrode plate 30 includes a negative lead 32 and a negative current collector 33 coated with a negative active material 31 on one side or both sides. The negative active material 31 can include a carbon material. The negative lead 32 is attached to an uncoated region 33a of the negative active material 31, in which the negative current collector 33 is not coated, by welding or using other methods. As illustrated in FIG. 1, the negative lead 32 protrudes to an outer side of the negative current collector 33 in the z-axis direction.

As illustrated in FIG. 2, an electrode assembly 1 is prepared by winding the positive electrode plate 10, the negative electrode plate 30, and the separator 20 around the winding core 40 that extends in the z-axis direction, and then removing the winding core 40. In this case, the positive and negative electrode plates 10 and 30 are layered and wound such that a portion of the positive lead 12 (i.e., an electrode terminal of the positive electrode plate 10), and a portion of the negative lead 32 (i.e., an electrode terminal of the negative electrode plate 30) are exposed and protrude in substantially the same direction (the positive z-axis direction in FIG. 1). Thus, as illustrated in FIG. 2, at least a portion of the positive lead 12, which protrudes to the outer side of the positive current collector 13, and at least a portion of the negative lead 32, which protrudes to the outer side of the negative current collector 33, are both placed substantially at an identical side (the positive z-axis direction) of the electrode assembly 1.

The electrode assembly 1 is filled with the liquid electrolyte solution, and then, the electrode assembly 1 is frozen. For example, the electrode assembly 1 is dipped in the liquid electrolyte solution, retrieved, and then frozen. The electrode assembly 1 is frozen so as to prevent the electrolyte solution from leaking to the outside from the electrode assembly 1, and to do so, the electrode assembly 1 is frozen quickly.

Next, the frozen electrode assembly 1 is dipped in a liquid polymer material 62 contained in a container 60, as illustrated in FIG. 3. Here, the liquid polymer material 62 can be, for example, liquid epoxy resin.

Figure 4:
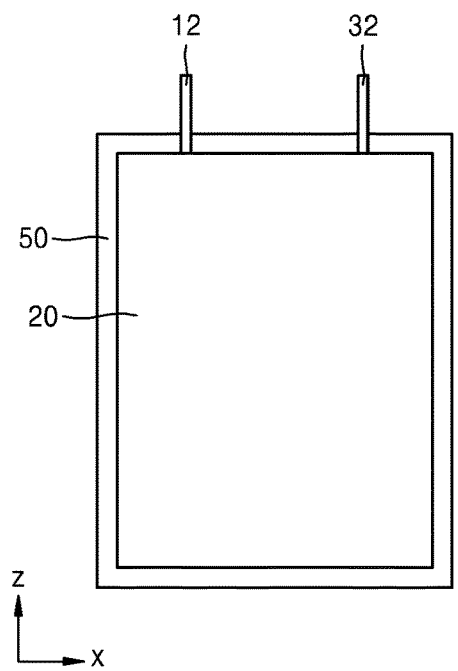
FIGS. 4 to 6 are conceptual views schematically illustrating a secondary battery, according to embodiments.

As illustrated in FIG. 3, frozen electrode assembly 1 is dipped in the liquid polymer material 62 such that a portion excluding the positive and negative leads 12 and 32 of the electrode assembly 1 (i.e., a portion excluding the two electrode terminals) are dipped in the liquid polymer material 62. Then, the electrode assembly 1 is retrieved from the liquid polymer material 62, and the liquid polymer material 62 is cured. Thus, a secondary battery, in which an external surface of the electrode assembly 1 is covered by a polymer material layer 50, is manufactured, as illustrated in FIG. 4. In this case, at least a portion of the positive lead 12 and at least a portion of the negative lead 32 are not covered by the polymer material layer 50, but externally exposed.

According to some embodiments, the secondary battery can be manufactured easily. Generally, a comparative method of manufacturing a secondary battery includes preparing and inserting an electrode assembly into a case (e.g., a can) and then injecting an electrolyte solution therein. In this case, however, there can be problems it is not easy to sufficiently fill the electrode assembly with the electrolyte solution. Another problem is that it can take a long time to fill electrode assembly with the electrolyte solution. However, the electrode assembly 1 is prepared as illustrated in FIG. 2 and the electrode assembly 1 is dipped in the liquid electrolyte solution without being inserted in a case, Thus, the electrode assembly 1 is filled with the electrolyte solution relatively easily. Accordingly, the electrolyte solution can be sufficiently filled in an inner portion of the electrode assembly 1 in a shorter amount of time.

Also, if the electrolyte solution is injected after the electrode assembly is prepared and inserted in a case, an empty space can exist between the case and the electrode assembly due to insertion of the electrode assembly or injection of the electrolyte solution. Therefore, an overall volume of the secondary battery can be increased, and thus, it is not possible to manufacture a thin secondary battery. However, the electrode assembly 1 is dipped in a liquid polymer material while being filled with the electrolyte solution. Then, the electrode assembly 1 is retrieved, and a polymer material on the surface of the electrode assembly 1 is cured so as to form a polymer material layer on the surface thereof. Accordingly, since the polymer material layer (which functions as the case), directly contacts the electrode assembly 1, and therefore an overall volume of the secondary battery can be significantly reduced. For example, since a casing process, i.e., a process of forming the polymer material, for forming an external shape of the secondary battery is performed after the electrode assembly 1 is filled with the electrolyte solution, a separate space for injecting the electrolyte solution is not necessary. Therefore, the overall volume of the secondary battery can be significantly reduced. Also, due to an absolute reduction of such empty space, a problem of swelling due to gas generated while using the secondary battery can be prevented or reduced.

The electrode assembly 1 can be filled with the electrolyte solution, and then dipped in the liquid polymer material without freezing the electrode assembly 1. In this case, however, during the manufacturing process, the electrolyte solution that is filled with the electrode assembly 1 is externally exposed before the polymer material layer is formed, thereby causing a faulty product. Therefore, after the electrode assembly 1 is filled with the electrolyte solution, the electrode assembly 1 should be dipped in the liquid polymer material in a frozen state. The electrolyte solution can be liquefied while the electrode assembly 1 is dipped in the liquid polymer material or after the electrode assembly 1 is retrieved from the liquid polymer material.

At least a portion of the positive lead 12 and at least a portion of the negative lead 32 should not be covered by the polymer material layer 50 and externally exposed so that the secondary battery can be recharged and discharged via the exposed portions of the positive and negative leads 12 and 32 when using the secondary battery. In some embodiments, when the electrode assembly 1 is dipped in the liquid polymer material as illustrated in FIG. 3, at least portions of the positive and negative leads 12 and 32 are not substantially simultaneously dipped in the liquid polymer material. In some embodiments, a portion of the positive lead 12 (i.e., the electrode terminal of the positive electrode plate 10), which protrudes to the outer side of the positive current collector 13, and at least a portion of the negative lead 32 (i.e., the electrode terminal of the negative electrode plate 30), which protrudes to the outer side of the negative current collector 33, can both be placed on one side (the positive z-axis direction) of the electrode assembly 1.

Figure 5:
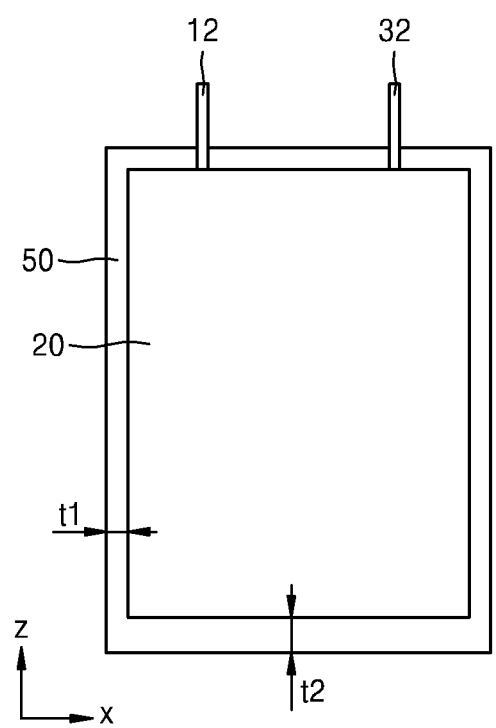

As illustrated in FIG. 4, in the secondary battery that is manufactured by the above-described method, the thickness of the polymer material layer 50 is substantially uniform. However, as illustrated in FIG. 5, a thickness t2 of the polymer material layer 50 on the other side (in the negative z-axis direction) of the electrode assembly 1 is generally greater than a thickness t1 thereof at a remaining portion of the electrode assembly except the other side. This is because at least a portion of the positive lead 12 (i.e., the electrode terminal of the positive electrode plate 10) and at least a portion of the negative lead 32 (i.e., the electrode terminal of the negative electrode plate 30) are both placed on the one side (the positive z-axis direction) of the electrode assembly 1 so that they both are not completely covered by the polymer material layer 50. Accordingly, while the electrode assembly 1 is being retrieved from the liquid polymer material, more liquid polymer material naturally remains on the other side (the negative z-axis direction) of the electrode assembly 1 due to gravity.

Figure 6:
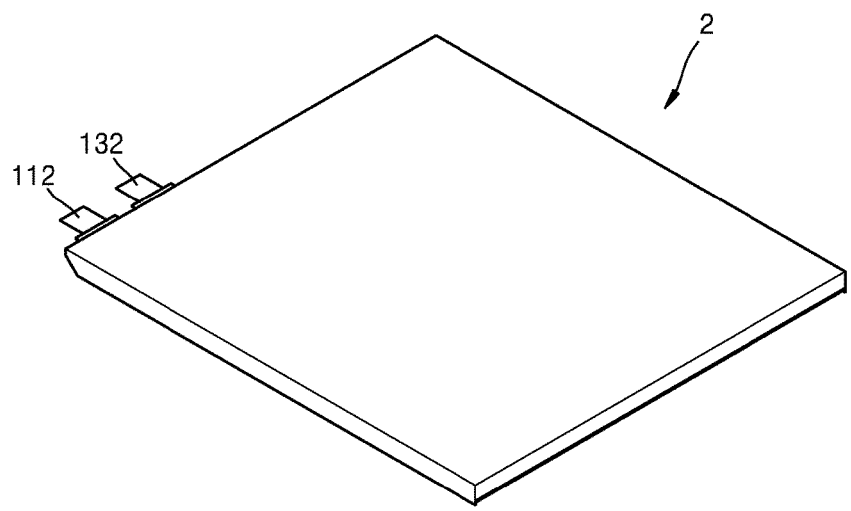

However, the embodiments are not limited to preparing the electrode assembly 1 by winding the positive electrode plate 10 and the negative electrode plate 30. For example, a flat electrode assembly 2 is manufactured by stacking a positive electrode plate, a negative electrode plate, and a separator placed therebetween the positive and negative electrode plates. In this embodiment, a positive lead 112 and a negative lead 132, are prepared as illustrated in FIG. 6. Then, the flat electrode assembly is filled with an electrolyte solution and frozen, the frozen electrode assembly is dipped in a liquid polymer material, the electrode assembly is retrieved, the liquid polymer material at a surface of the electrode assembly is cured, and thus, a secondary battery as illustrated in FIG. 6 is manufactured. In some embodiments, at least portions of the positive and negative leads 112 and 132 are not completely covered with a polymer material layer but externally exposed.

Although the electrode assembly 1 of the secondary battery has been described as having a circular shape in the above-described embodiments, the described technology is not limited thereto. The electrode assembly 1 can be pressed and thus have a flat shape. For example, a secondary battery according to an embodiment includes a flat electrode assembly that is manufactured by stacking a positive electrode plate, a negative electrode plate, and a separator placed therebetween, In this embodiment, the flat electrode assembly includes the positive electrode lead 112 and the negative electrode lead 132. Then, a polymer material layer can cover an external surface of the flat electrode assembly so that an inner surface of the polymer material layer directly contacts the flat electrode assembly. Also, in this embodiment, at least portions of the positive and negative leads 112 and 132 are not covered by the polymer material layer but they are externally exposed.

It should be understood that the exemplary embodiments described herein should be considered in a descriptive sense only and not for purposes of limitation. Descriptions of features or aspects within each embodiment should typically be considered as available for other similar features or aspects in other embodiments.

While the inventive technology has been described with reference to the figures, it will be understood by those of ordinary skill in the art that various changes in form and details can be made therein without departing from the spirit and scope of the present invention as defined by the following claims.

What is claimed is:

1. A secondary battery comprising:
   an electrode assembly comprising positive and negative electrode plates and a separator interposed therebetween;
   an electrolyte solution provided between the electrode plates; and
   a polymer material layer cured directly on an external surface of the electrode assembly to function as a secondary battery case for the electrode assembly, the polymer material layer being formed seamlessly as a single body, wherein the polymer material layer has no opening for provisioning the electrolyte solution, and wherein the electrolyte solution is maintained in a liquid state inside the electrode assembly and fully enclosed by the single body polymer material layer functioning as the secondary battery case.

2. The secondary battery of claim 1, wherein the polymer material layer has a substantially uniform thickness.

3. The secondary battery of claim 1, wherein the electrode assembly further comprises two electrode terminals that protrude from a first side of the electrode assembly, and wherein the polymer material layer substantially covers the external surface of the electrode assembly except for the two electrode terminals.

4. The secondary battery of claim 3, wherein the thickness of the polymer material layer on a second side of the electrode assembly opposite to the first side is greater than the thickness of the polymer material layer of the remaining portions of the electrode assembly.

5. The secondary battery of claim 1, wherein the polymer material layer comprises epoxy.

6. A secondary battery comprising:
   an electrode assembly comprising i) positive and negative electrode plates; ii) a separator interposed between the electrode plates; and iii) electrode terminals electrically connected to the electrode plates and protruding from a first side of the electrode assembly;
   an electrolyte solution provided between the electrode plates and the separator; and
   a polymer material layer cured directly on an external surface of the electrode assembly to function as a secondary battery case for the electrode assembly, wherein the polymer material layer is exposed to the environment and is formed seamlessly as a single body, wherein the polymer material layer has no opening for provisioning the electrolyte solution, and wherein the electrolyte solution is maintained in a liquid state inside electrode assembly and fully enclosed by the single body polymer material layer functioning as the secondary battery case.

7. The secondary battery of claim 6, wherein the polymer material layer has a substantially uniform thickness.

8. The secondary battery of claim 6, wherein the thickness of the polymer material layer on a second side of the electrode assembly opposite to the first side is greater than the thickness of the polymer material layer of the remaining portions of the electrode assembly.

9. The secondary battery of claim 6, wherein the polymer material layer comprises epoxy.

10. The secondary battery of claim 6, wherein the electrode assembly is wound.

11. The secondary battery of claim 6, wherein the electrode assembly is substantially rectangular.

12. The secondary battery of claim 1, wherein the polymer material layer fully surrounds a perimeter of the electrode assembly.

13. The secondary battery of claim 1, wherein the positive electrode plate includes a positive lead outwardly extending from the electrode assembly, wherein the negative electrode plate includes a negative lead outwardly extending from the electrode assembly, and wherein at least a portion of each of the positive and negative leads passes through the polymer material layer to be exposed to the environment.

14. The secondary battery of claim 1, wherein the entire inner surface of the polymer material layer directly contacts the electrode assembly.

15. The secondary battery of claim 1, wherein the electrolyte solution is configured to be frozen before the polymer material layer is cured on the external surface of the electrode assembly.

16. The secondary battery of claim 1, wherein the polymer material layer is integrally formed with and fully surrounds the external surface of the electrode assembly.

17. The secondary battery of claim 1, wherein the polymer material layer is configured as a single layer case exposed to the environment.

18. The secondary battery of claim 1, further comprising positive and negative leads extending from the electrode assembly, wherein the polymer material layer is directly formed on a portion of each of the positive and negative leads.

* * * * *